United States Patent
Rinne et al.

(10) Patent No.: US 8,462,671 B2
(45) Date of Patent: Jun. 11, 2013

(54) TERMINAL HAVING A VARIABLE DUPLEX CAPABILITY

(75) Inventors: Mika P. Rinne, Espoo (FI); Pauli Seppinen, Vantaa (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/887,088

(22) PCT Filed: Apr. 7, 2005

(86) PCT No.: PCT/IB2005/001138
§ 371 (c)(1),
(2), (4) Date: Jan. 2, 2009

(87) PCT Pub. No.: WO2006/106378
PCT Pub. Date: Oct. 12, 2006

(65) Prior Publication Data
US 2009/0213765 A1    Aug. 27, 2009

(51) Int. Cl.
*H04B 1/44* (2006.01)
(52) U.S. Cl.
USPC ........... 370/278; 370/276; 370/277; 370/294; 370/296
(58) Field of Classification Search
USPC ................. 455/83, 101, 562.1; 370/278, 280, 370/335
See application file for complete search history.

(56) References Cited

U.S. PATENT DOCUMENTS

| | | | | |
|---|---|---|---|---|
| 4,712,229 A | * | 12/1987 | Nakamura | 455/465 |
| 4,742,510 A | * | 5/1988 | Quatieri et al. | 370/290 |
| 5,121,382 A | * | 6/1992 | Yang et al. | 370/250 |
| 5,561,666 A | * | 10/1996 | Christensen et al. | 370/276 |
| 5,574,441 A | * | 11/1996 | Roes et al. | 340/870.31 |
| 5,678,189 A | * | 10/1997 | Barnes | 455/509 |
| 5,691,978 A | * | 11/1997 | Kenworthy | 370/278 |
| 5,696,880 A | * | 12/1997 | Gustafson et al. | 704/273 |
| 5,710,981 A | * | 1/1998 | Kim et al. | 455/69 |
| 5,722,063 A | * | 2/1998 | Peterzell et al. | 455/287 |
| 5,825,755 A | * | 10/1998 | Thompson et al. | 370/296 |
| 5,886,988 A | * | 3/1999 | Yun et al. | 370/329 |
| 6,567,653 B1 | * | 5/2003 | Sanders | 455/126 |
| 6,741,587 B2 | * | 5/2004 | Holma et al. | 370/362 |
| 6,804,267 B1 | * | 10/2004 | Long et al. | 370/524 |

(Continued)

FOREIGN PATENT DOCUMENTS

| | | |
|---|---|---|
| CN | 1255258 | 5/2000 |
| CN | 1292959 A | 4/2001 |

(Continued)

OTHER PUBLICATIONS

"S2.31 v0.1.0 RRC Protocol Specification", TSG-RAN WG2, TSGR#3(99))265, Apr. 1999, 94 pgs.

*Primary Examiner* — Ricky Ngo
*Assistant Examiner* — Rasheed Gidado
(74) *Attorney, Agent, or Firm* — Harrington & Smith (57) ABSTRACT

A cellular telecommunications terminal having a full-duplex mode of operation and a half-duplex mode of operation, including a first cellular transmitter and a first cellular receiver operable, when the terminal is in the full-duplex mode, to transmit and receive at the same time and operable, when the terminal is in the half-duplex mode, to transmit and receive at different times and not at the same time; and a switching control for changing the mode of operation of the terminal while operating in the full-duplex mode from the full-duplex mode to the half-duplex mode.

22 Claims, 2 Drawing Sheets

U.S. PATENT DOCUMENTS

| | | | |
|---|---|---|---|
| 6,983,147 B1 * | 1/2006 | Hans et al. | 455/436 |
| 7,890,113 B2 * | 2/2011 | Jones et al. | 455/447 |
| 2003/0203743 A1 * | 10/2003 | Sugar et al. | 455/550.1 |
| 2004/0121753 A1 | 6/2004 | Sugar et al. | 455/333 |
| 2004/0131111 A1 * | 7/2004 | Palm | 375/222 |
| 2004/0198425 A1 * | 10/2004 | Mellone et al. | 455/553.1 |
| 2004/0252659 A1 * | 12/2004 | Yun et al. | 370/328 |
| 2005/0243780 A1 * | 11/2005 | Trainin et al. | 370/338 |
| 2005/0271006 A1 * | 12/2005 | Chari et al. | 370/329 |
| 2006/0023649 A1 * | 2/2006 | Tillet et al. | 370/310 |
| 2006/0025165 A1 * | 2/2006 | Tillet et al. | 455/517 |

FOREIGN PATENT DOCUMENTS

| | | |
|---|---|---|
| CN | 1385049 A | 12/2002 |
| EP | 0 660 626 A2 | 6/1995 |
| EP | 1 349 413 A1 | 3/2003 |
| GB | 2 322 051 A | 8/1998 |
| GB | 2 395 632 A | 5/2004 |
| JP | 2004 187292 A | 7/2004 |
| WO | WO 92/00634 | 1/1992 |
| WO | WO9839860 | 9/1998 |
| WO | WO0041354 | 7/2000 |
| WO | WO-00/54536 A1 | 9/2000 |
| WO | WO-01/17303 A1 | 3/2001 |
| WO | WO0131968 | 5/2001 |
| WO | WO 01/80436 A2 | 10/2001 |
| WO | WO 02/25853 A2 | 3/2002 |
| WO | WO 03/053085 A1 | 6/2003 |
| WO | WO 03/090370 A1 | 10/2003 |

\* cited by examiner

TERMINAL HAVING A VARIABLE DUPLEX CAPABILITY

FIELD OF THE INVENTION

Embodiments of the present invention relate to a cellular telecommunications terminal. In particular, they relate to terminals having different duplex capabilities.

BACKGROUND TO THE INVENTION

It is known to have cellular telecommunications terminals that operate in a half-duplex mode i.e. they do not transmit and receive at the same time. An example of such a terminal is a GSM mobile telephone and some GPRS mobile telephones.

It is known to have cellular telecommunications terminals that operate in a full-duplex mode i.e. they transmit and receive at the same time. An example of such a terminal is a high-end GPRS mobile telephone and a WCDMA mobile telephone.

A dual mode telephone may therefore change its duplex capability by switching from a GSM mode of operation to a WCDMA mode of operation. The RF circuitry and antennas used for respectively operating in the GSM mode and WCDMA mode will typically be different and separate.

A key component of a full-duplex terminal is a duplexer which connects the transmitter and receiver to the antenna and prevents the symbols transmitted by the transmitter interfering with the symbols received by the receiver. Duplexers are expensive, consume power and have a large volume. It would therefore be desirable to reduce the use of duplexers or to use cheaper, less power hungry and smaller duplexers.

Currently duplexers are designed to provide enough isolation between the receiver and transmitter when the transmitter is operating at maximum power. If this constraint were relaxed, it may be possible to use cheaper, less power hungry and smaller duplexers.

There is a current trend towards the use of multiple antennas within a terminal. These antennas each have their own associated channels or may diversify a channel. However, the addition of multiple antennas typically also requires the use of multiple duplexers to isolate every receiver branch from every transmitter branch. It would be desirable to provide for the use of multiple antennas without the use of a duplexer at each antenna.

BRIEF DESCRIPTION OF THE INVENTION

According to one embodiment of the invention there is provided a cellular telecommunications terminal having a full-duplex mode of operation and a half-duplex mode of operation, comprising: a first cellular transmitter and a first cellular receiver operable, when the terminal is in the full-duplex mode, to transmit and receive at the same time and operable, when the terminal is in the half-duplex mode, to transmit and receive at different times and not at the same time; and a switching control for changing the mode of operation of the terminal while operating in the full-duplex mode from the full-duplex mode to the half-duplex mode.

The switching control may also change the mode of operation of the terminal while operating in the half-duplex mode from the half-duplex mode to the full-duplex mode.

The terminal may consequently either operate at its full capability i.e. in full-duplex mode or at a reduced capability i.e. half-duplex mode. The switch between modes may, for example, occur when the duplexer separating the first transmitter and the first receiver reaches its isolation limit. This may, for example, be detected by detecting the self-interference at the first receiver from the first transmitter or by detecting the power of transmission from the first transmitter.

The ability of the terminal to operate at different duplex capabilities allows the network to allocate resources according to those capabilities. The terminal may inform the network of its current duplex capabilities The network further offers any terminal, with any defined duplex capability, resources to efficiently operate in the network. The terminal may, but need not, be able to switch its duplex capability, but it shall be able to uniquely signal its duplex capability.

According to another embodiment of the invention there is provided a cellular telecommunications terminal having a full-duplex mode of operation and a half-duplex mode of operation, comprising: a plurality of cellular transmitters and receivers; and a controller for controlling at least one of the transmitters to transmit a capability message indicating the duplex capability of each of multiple antennas.

The terminal may have a fixed duplex capability or it may have a variable duplex capability. If the duplex capability is variable, then the capability message may indicate the current capability of the terminal.

According to another embodiment of the invention there is provided a cellular telecommunications network element comprising: a controller arranged to use a received capability message indicating the current duplex capability of each of multiple antennas, of a terminal to allocate resources in the network.

According to another embodiment of the invention there is provided a cellular telecommunications terminal having a full-capability mode of operation in which at least one antenna is capable of full-duplex operation and a reduced-capability mode of operation in which the at least one antenna is capable of half-duplex operation, the terminal comprising: a plurality of cellular transmitters and receivers; and a controller for controlling at least one of the transmitters to transmit a capability message indicating the reduced-capability mode of operation.

According to another embodiment of the invention there is provided a cellular telecommunications network element comprising: a controller arranged to use a received capability message indicating the reduced-capability mode of operation to allocate resources in the network.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
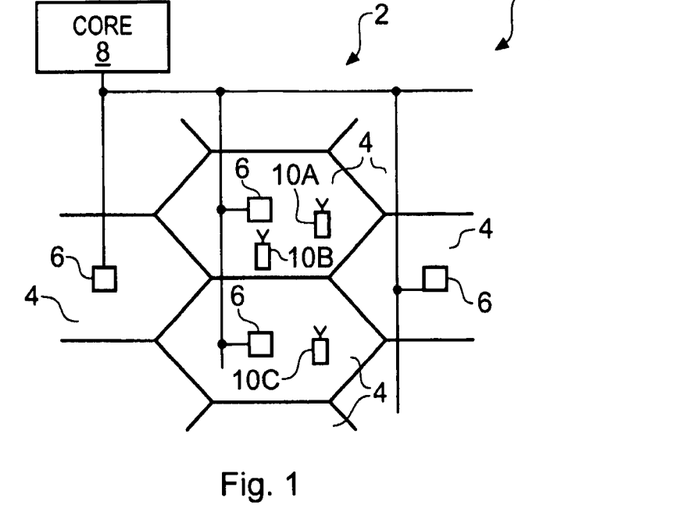
FIG. 1 illustrates a cellular telecommunications system 1 including a cellular telecommunications network 2 and a plurality of cellular telecommunication terminals 10A, 10B, 10C.

FIG. 1 illustrates a cellular telecommunications system 1 including a cellular telecommunications network 2 and a plurality of cellular telecommunication terminals 10A, 10B, 10C. Each cell 4 of the network is served by a base station 6 and the base stations are controlled by core network elements 8.

One of the cellular telecommunications terminals may be half-duplex capable. The half-duplex capable terminal comprises a first cellular transmitter for transmitting in a first transmission frequency band, a first cellular receiver for receiving in a first reception frequency band, different to the first transmission frequency band. The half-duplex terminal does not include any duplexer.

Figure 2:
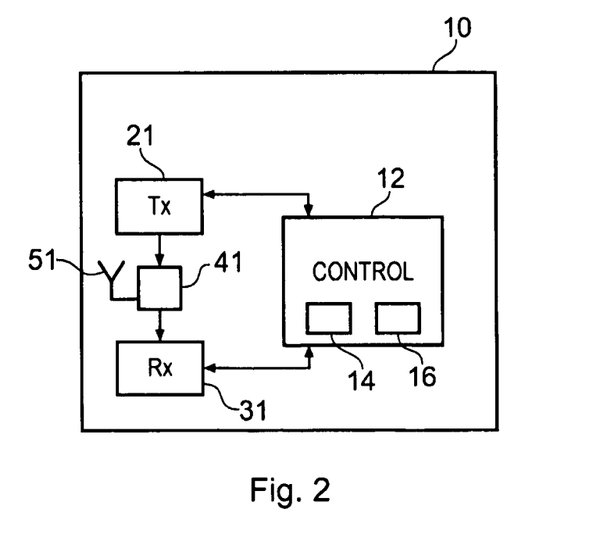
FIG. 2 illustrates a full-duplex capable cellular telecommunications terminal.

At least one of the cellular telecommunications terminals 10 is full-duplex capable. The full-duplex capable terminal 10 is schematically illustrated in FIG. 2. It comprises a first cellular transmitter 21 for transmitting in a first transmission frequency band, a first cellular receiver 31 for receiving in a first reception frequency band, different to the first transmission frequency band, and a duplexer 41 joining the first cellular transmitter 21 and first cellular receiver 31 to a first antenna 51. In other embodiments, the duplexer may, instead of being placed where the Rx path and Tx path join the antenna, it may be placed in either the Rx path or the Tx path.

The terminal 10 has a full-duplex mode of operation in which the first cellular transmitter 21 transmits symbols from the first antenna 51 and the first cellular receiver 31 simultaneously receives symbols via the first antenna 51. The isolation provided by the duplexer 41 prevents the transmitted symbols interfering with the received symbols i.e. prevents self-interference.

The terminal 10 has a half-duplex mode of operation in which transmission and reception occurs at different times and not at the same time. The first cellular transmitter 21 transmits symbols from the first antenna 51 at first times and the first cellular receiver 31 receives symbols via the first antenna 51 at second times, different to the first times.

The terminal 10 additionally comprises a controller 12. The controller 12 provides a switching control 14 and signalling control 16.

Switching control 14 changes the mode of operation of the terminal 10. When the terminal is operating in the full-duplex mode, the switching control 14 can change the operation mode from the full-duplex mode to the half-duplex mode. When the terminal 10 is operating in the half-duplex mode, the switching control 14 can change the operational mode from the half-duplex mode to the full-duplex mode.

The trigger for the switching control 14 may be provided by any one of a number of different means.

In one embodiment, a signal received from the network 2 via receiver 31 functions as the trigger.

In another embodiment, the trigger is the connection of the device 10 to another device such as a docking station with external antennas or improved power supply etc.

In another embodiment, self-interference detection performed at the terminal 10 functions as the trigger. The interference in the symbols received at the first cellular receiver is detected. The received signal strength indicator (RSSI), the received signal-to-interference ratio (SIR), the received interference power, the bit error rate (BER), the frame error rate (FER) etc may be used as a measure of interference. A measure of self interference may, for example, be obtained by measuring interference power when the transmitter is on and measuring interference power when the transmitter is off. The change in operational mode to half-duplex mode is triggered when the detected (self) interference exceeds a first predetermined interference threshold. The change in operational mode back to full-duplex mode is triggered when the detected (self) interference falls beneath a second predetermined interference threshold. The first and second thresholds may be different (bi-stability) or the same. Crossing a threshold may involve timing constraints to avoid too frequent change of modes.

In another embodiment, the power output of the cellular transmitter 21 functions as the trigger. The change in operational mode to half-duplex mode is triggered when the power output exceeds a first predetermined power threshold. The change in operational mode back to full-duplex mode is triggered when the power output falls beneath a second predetermined power threshold, which is typically the same as the first predetermined threshold but may be different. The power threshold may be dependent upon the characteristics of the duplexer. In one example, the predetermined power threshold is chosen so that the isolation provided by the duplexer 41 between the first cellular transmitter 21 and first cellular receiver 31 is adequate while the power output of the first transmitter 21 does not exceed the predetermined threshold and is inadequate when the power output of the first transmitter 21 exceeds the predetermined threshold.

Figure 3:
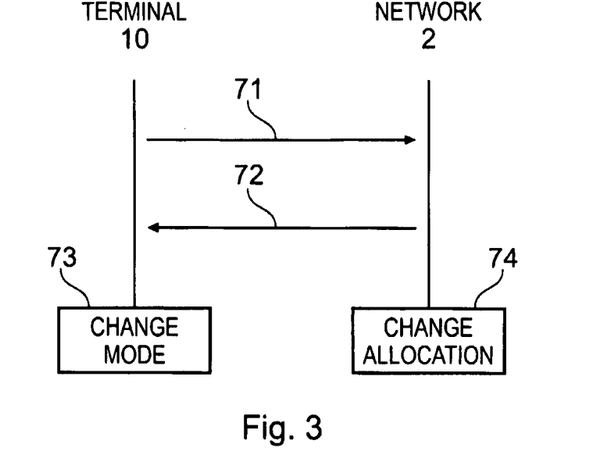
FIG. 3 illustrates a message exchange between the terminal 10 and the network 2.

In a preferred embodiment, the switching control 14 is not immediately responsive to a trigger but first exchanges messages with the network 2 before making the change in operational mode as illustrated in FIG. 3.

In response to a trigger, the signalling control 16 of the controller 12 controls the first transmitter 21 to send a request message 71 to the network 2. The request message 71 identifies the new operational mode and may be sent as a capability information message.

If the first receiver 31 of the terminal 10 receives a reply message 72 from the network 2, the switching control 14 changes 73 the operational mode of the terminal. The switch may optionally be delayed until further confirmation of the switch is received from the network 2.

The messages 71, 72 may be discrete messages or may be included as Information elements in some other messages.

The network 2 changes the resource allocation 74 to take account of the change in mode of the terminal 10. For example, if the terminal 10 were in full-duplex mode there is no constraint upon when the terminal 10 is expected to transmit to the network 2 and is transmitted to by the network 2. However, if the mode of the terminal 10 is changed to half-duplex, then transmissions to the terminal and transmissions from the terminal are constrained so that they do not coincide. The constraint is such that enough guard time is left between transmission and reception at the terminal 10. Network 2 also has to reserve proper measurement intervals for terminal 10 to measure carriers on other frequencies, carriers on other frequency bands or carriers of other systems, so that the measurement intervals do not coincide with terminal transmissions to the network 2 nor transmissions by the network 2 to terminal 10.

Figure 4:
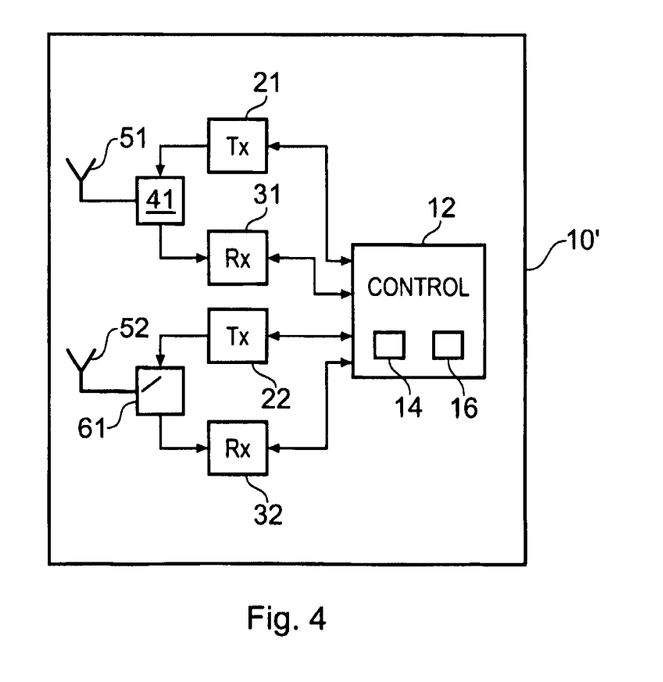
FIG. 4 schematically illustrates a full-duplex capable, multi-antenna terminal 10'

A full-duplex capable, multi-antenna terminal 10' is schematically illustrated in FIG. 4. It comprises the same components as described with reference to FIG. 2 but additionally comprises a second cellular transmitter 22, a second cellular receiver 32 and a switch element 51 joining the second cellular transmitter 22 and the second cellular receiver 32 to a second antenna 52. The first and second transmitters operate on the same carrier frequency. The first and second receivers operate on the same carrier frequency. The carrier frequency of the transmitters is separate from the carrier frequency of the receivers. In some examples, the carrier frequency of the transmitters may be the same as the carrier frequency of the receivers, if proper constraints are respected for transmission and reception. In some examples, the first and second transmitters may operate on separate carrier frequencies or on carriers on separate frequency bands. Respectively, the first and second receiver may operate on separate carrier frequencies or on carriers on separate frequency bands.

The terminal 10' may only use one of its first and second transmitters and operate in a single input to uplink (SI-u) mode. The SI-u mode may be either a Single Input Single Output (SISO) mode, if the base station has a single receiver antenna or a Single Input Multiple Output (SIMO) mode, if the base station has more than one receiver antenna.

The terminal 10' may use both of its first and second transmitters and operate in a multiple input to uplink (MI-u) mode, The MI-u mode may be either a Multiple Input Single Output (MISO) mode, if the base station has a single receiver antenna or a Multiple Input Multiple Output (MIMO) mode, if the base station has more than one receiver antenna.

The terminal 10' may use one of its first and second receivers and operate in a single output from downlink (SO-d) mode. The SO-d mode may be either a SISO mode, if the base station has a single transmitter antenna or a MISO mode, if the base station has more than one transmit antennas.

The terminal 10' may use both of its first and second receivers and operate in a multiple output from downlink (MO-d) mode. The MO-d mode may be either a SIMO mode if the base station has a single transmitter antenna or a MIMO mode if the base station has more than one transmitter antenna.

The terminal 10' may operate as a single input uplink (SI-u) terminal by using only one of the transmitters 21, 22 and as a single output downlink (SO-u) terminal by using only one of the receivers 31, 32. For example, if only the first transmitter 21 and first receiver 31 are used, then the terminal 10' may operate as either a full-duplex or half-duplex SISO terminal. If only the second transmitter 22 and the second receiver 32 are used, then the terminal 10' may operate as only a half-duplex SISO terminal.

The terminal 10' may operate as a multiple input single output (MISO) terminal by using both of the transmitters 21, 22 (MI-u) and only one of the receivers 31, 32 (SO-d). If the receiver used is the first receiver 31, then the terminal 10' may operate as either a full-duplex or half-duplex (MISO) terminal 10'. If the receiver used is the second receiver 32, then the terminal 10' may operate as only a half duplex (MISO) terminal 10'.

The terminal 10' may operate as a single input multiple output (SIMO) terminal by using one of the transmitters 21, 22 (SI-u) and both of the receivers 31, 32 (MO-d). If the transmitter used is the first transmitter 21, then the terminal 10' may operate as either a full-duplex or half duplex (SIMO) terminal 10'. If the transmitter used is the second transmitter 22, then the terminal 10' may operate as only a half duplex (SIMO) terminal 10'.

The terminal 10' may operate as a multiple input multiple output (MIMO) terminal by using both of the transmitters 21, 22 (Ml-u) and both of the receivers 31, 32 (MO-d). The terminal 10' may operate as only a half duplex MIMO terminal. If the switch 61 were replaced by a duplexer, terminal 10' may operate as a full-duplex MIMO terminal instead. If the duplexer 41 were originally replaced by a switch, terminal 10' may operate as only a half duplex terminal.

It will therefore be appreciated that the use of a switch element 61 instead of a duplexer 41 between the second transmitter 22 and the second receiver 32, constrains some of the multi-antenna modes of the terminal 10' to half-duplex modes, whereas if a duplexer were used there would be an option of using either half-duplex or full-duplex modes. However, the reduction in the number of duplexers has significant advantages. Duplexers are expensive, consume power and occupy a large volume. These disadvantages become particularly problematic in multi-antenna terminals. Consequently the terminal 10' may be cheaper, smaller and more efficient than conventional multi-antenna terminals that use only duplexers.

The capability of the terminal 10' namely that only half-duplex is available for some combinations of the SI-u and MI-u modes with the SO-d and MO-d modes needs to be communicated to the network so that it can be taken into account in network resource allocation.

The signalling control 16 of the controller 12 controls the first transmitter 21 to send a message 71 to the network 2. The message indicates duplex capability for each mode combination (SISO, SIMO, MISO, MIMO). The message may for example, indicate for each antenna of the terminal 10', whether an antenna is associated with a transmitter and receiver that are full-duplex capable or a transmitter and receiver that are not full-duplex capable. The message may be extended to indicate whether an antenna is associated with a transmitter only or a receiver only. The message 71 may be a discrete message or may be included as Information elements in some other message.

The terminal 10' may switch between full-duplex mode and half-duplex mode on a transition from using a single antenna to using multiple antennas or on any transition between multi-antenna configurations from SISO to SIMO, MISO or MIMO, from SIMO to SISO, MISO or MIMO, from MISO to SISO, SIMO or MIMO or from MIMO to SISO, SIMO or MISO.

Even when the terminal is capable of operating at full-duplex e.g. during MIMO modes (SISO, SIMO, MISO, MIMO), the terminal 10 may instead operate with reduced capabilities e.g. half-duplex within its set of full capabilities. A decision to operate with reduced capabilities may be made by the terminal 10' or the network. If it is made by the terminal, it needs to be communicated to the network. A convenient way of communicating is to send a new message 71 to the network 2 that identifies the reduced capabilities of the terminal 10' e.g. half-duplex at SISO, half-duplex at SIMO, half-duplex at MISO or half-duplex at MIMO.

The terminal 10' is able to switch between full-capabilities (e.g. full-duplex mode) and reduced capabilities (e.g. half-duplex mode). Switching control 14 changes the operational capabilities of the terminal 10'. When the terminal 10' is operating in the full-duplex mode, the switching control 14 can change the operational mode from the full-duplex mode to the half-duplex mode. When the terminal 10 is operating in the half-duplex mode, the switching control 14 can change the operational mode from the half-duplex mode to the full-duplex mode (if possible).

The trigger for the switching control 14 may be provided by any one of a number of different means.

In one embodiment, a signal received from the network 2 via the transmitter 21, 22 functions as the trigger.

In another embodiment, the trigger is the connection of the device 10 to another device such as a docking station with external antennas or improved power supply etc.

In another embodiment, self-interference detection performed at the terminal 10 functions as the trigger. While one receiver 31, 32 is used to receive symbols the other receiver 32, 31 is used to measure interference. A measure of self interference may be obtained by measuring interference when the transmitter is on and measuring interference when the transmitter is off. The change in operational mode to half-duplex mode is triggered when the detected (self) interference exceeds a first predetermined interference threshold. The change in operational mode back to full-duplex mode is triggered when the detected (self) interference falls beneath a second predetermined interference threshold. The first and second thresholds may be different (bi-stability) or the same. Crossing a threshold may involve timing constraints to avoid too frequent change of modes.

In another embodiment, the power output of the cellular transmitter 21 functions as the trigger. The change in operational mode to half-duplex mode is triggered when the power output exceeds a first predetermined power threshold. The change in operational mode back to full-duplex mode is triggered when the power output falls beneath a second predetermined power threshold, which is typically the same as the first predetermined threshold but may be different. Crossing a threshold may involve timing constraints to avoid too frequent change of modes. The power threshold may be dependent upon the characteristics of the duplexer 41.

The use of the power output or self-interference as the trigger is useful for a reduced full-duplex capability implementation. In this implementation, the device is capable of operating in full-duplex mode unless one of the transmit power or self-interference exceeds their respective predetermined thresholds. The predetermined power threshold is chosen so that the isolation provided by the duplexer 41 between the first cellular transmitter 21 and first cellular receiver 31 is adequate while the power output of the first transmitter 21 does not exceed the predetermined threshold and is inadequate when the power output of the first transmitter 21 exceeds the predetermined threshold.

In a full-duplex implementation, the duplexer is capable of operating across the whole power and signal-to-noise ratio range of values.

It should be appreciated that in the foregoing, the full-duplex and half-duplex modes of operation are different modes of the same mobile telephone mode. That is the same FDD communication protocol is used in the full-duplex and half-duplex modes of operation.

Although embodiments of the present invention have been described in the preceding paragraphs with reference to various examples, it should be appreciated that modifications to the examples given can be made without departing from the scope of the invention as claimed.

We claim:

1. An apparatus, comprising:
    a first cellular transmitter configured to operate with at least one carrier frequency, and
    a first cellular receiver, wherein the first cellular transmitter and the first cellular receiver are configured, when the apparatus is in a full-duplex mode, to transmit and receive at the same time and configured, when the apparatus is in a half-duplex mode, to transmit and receive at different times and not at the same time;
    a signalling control configured to control the first cellular transmitter to transmit a capability information message to a cellular telecommunications network using a radio frequency signal, the capability information message comprising information identifying to the cellular telecommunications network whether full-duplex mode operation or half-duplex mode operation of the apparatus is available for the at least one carrier frequency; and
    a switching control configured to change the mode of operation of the apparatus, from operating in the full-duplex mode to operating in the half-duplex mode or from operating in the half-duplex mode to operating in the full-duplex mode in response to at least one trigger condition,
    wherein the at least one trigger condition comprises receiving a signal from the cellular telecommunications network; and
    wherein the switching control is responsive to interference detected at the first cellular receiver, and a change in operational mode to half-duplex mode occurs when the detected interference exceeds a threshold.

2. The apparatus as claimed in claim 1, wherein the first cellular transmitter uses a first antenna and first cellular receiver uses the same first antenna.

3. The apparatus as claimed in claim 1, wherein the switching control configured to be responsive to a power output of the first cellular transmitter, and configured to change the operational mode of the apparatus, from the full-duplex mode to the half-duplex mode, when the power output exceeds a power threshold.

4. The apparatus as claimed in claim 3, further comprising a duplexer joining the first cellular transmitter and first cellular receiver to the first antenna element, wherein isolation is provided by the duplexer between the first cellular transmitter and first cellular receiver, wherein the isolation is adequate while the power output of the first transmitter does not exceed the power threshold, and the isolation is inadequate when the power output of the first cellular transmitter exceeds the power threshold.

5. The apparatus as claimed in claim 1, further comprising:
    a second cellular transmitter, suitable for use in a mobile cellular telecommunications terminal, and a second cellular receiver, suitable for use in a mobile telecommunications terminal.

6. The apparatus as claimed in claim 5, wherein the switching control is configured to be responsive to interference detected using the second cellular receiver, and configured to change the operational mode of the apparatus, from the full-duplex mode to the half-duplex mode, when the detected interference exceeds a threshold.

7. The apparatus as claimed in claim 5, wherein the switching control is configured to be responsive to a power output of the second cellular transmitter, and configured to change the operational mode of the apparatus, from the full-duplex mode to the half-duplex mode, when the power output of the second cellular transmitter exceeds a threshold.

8. The apparatus as claimed in claim 5, wherein the half-duplex mode is one of:
    a) transmission from a single antenna without simultaneous reception at the single antenna;
    b) simultaneous transmissions from a first antenna and a second antenna without simultaneous reception at the first or second antenna; and
    c) simultaneous reception at a first antenna and a second antenna without simultaneous transmission from the first or second antenna.

9. The apparatus as claimed in claim 5, wherein the full duplex mode is one of:
    a) transmission from a single antenna with simultaneous reception at the single antenna;
    b) simultaneous transmissions from a first antenna and a second antenna with simultaneous reception at the first or second antenna;
    c) simultaneous receptions at a first antenna and a second antenna with simultaneous transmission from the first or second antenna; and
    d) simultaneous receptions at a first antenna and a second antenna with simultaneous transmissions from the first and second antennas.

10. The apparatus as claimed in claim 5, comprising a switching element joining the second cellular transmitter and second cellular receiver to a second antenna element, and wherein the full-duplex mode is one of:

a) transmission from the first antenna element with simultaneous reception at the first antenna element;
b) simultaneous transmissions from the first antenna element and the second antenna element with simultaneous reception at the first antenna element but hot at the second antenna element; and
c) simultaneous reception at the first antenna element and the second antenna element with simultaneous transmission from the first antenna element but not from the second antenna element.

11. The apparatus as claimed in claim 5, further comprising the signalling control configured to control the sending of a capability message indicating a reduced-duplex-capability of the apparatus.

12. The apparatus as claimed in claim 1, wherein the capability message indicates the duplex capability of multiple antennas.

13. The apparatus as claimed in claim 1, wherein the first cellular transmitter and the first cellular receiver are configured to use a first communication protocol while the apparatus is in the full-duplex mode, and configured to continue to use the first communication protocol after the switching control has changed the apparatus from being in the full-duplex mode to being in the half-duplex mode.

14. The apparatus as claimed in claim 1, wherein the at least one trigger condition is one of a self-interference detection level at the apparatus, a transmit power level of the first cellular transmitter, a transition in antenna configuration or a change of connection state of the apparatus to another apparatus.

15. An apparatus comprising:
a plurality of cellular transmitters and receivers, where each cellular transmitter is configured to operate with at least one carrier frequency;
a controller configured to control at least one of the cellular transmitters to transmit a capability message to a cellular telecommunications network using a radio frequency signal, the capability message comprising information indicating to a cellular telecommunications network whether full-duplex mode operation or half-duplex mode operation of the apparatus is available for at least one carrier frequency; and
a switching control configured to change the mode of operation of the apparatus, from operating in the full-duplex mode to operating in the half-duplex mode or from operating in the half-duplex mode to operating in the full-duplex mode in response to at least one trigger condition; wherein the switching control is responsive to interference detected by at least one of the cellular receivers, and a change in operational mode to half-duplex mode occurs when the detected interference exceeds a threshold.

16. The apparatus as claimed in claim 15, wherein a duplex capability of an antenna may change and wherein the controller is configured to control at least one of the transmitters to transmit an updated capability message in response to such a change.

17. The apparatus as claimed in claim 16, wherein the duplex capability of an antenna changes as a result of high self-interference measurements.

18. The apparatus as claimed in claim 16, wherein the duplex capability of an antenna changes as a result of high transmission power measurements.

19. An apparatus, comprising:
a controller configured to:
use a capability message received as a radio frequency signal from a mobile cellular telecommunications terminal, wherein the capability message indicates whether full-duplex mode operation or half-duplex mode operation of the mobile cellular telecommunications terminal is available for at least one carrier frequency that can be transmitted by the mobile cellular telecommunications terminal;
allocate resources in the cellular telecommunications network according to the received capability message; and
change the mode of operation of the apparatus, from operating in the full-duplex mode to operating in the half-duplex mode or from operating in the half-duplex mode to operating in the full-duplex mode in response to at least one trigger condition; wherein the controller is responsive to interference detected by the mobile cellular telecommunications terminal, and a change in operational mode to half-duplex mode occurs when the detected interference exceeds a threshold.

20. An apparatus comprising:
at least one cellular transmitter and at least one cellular receiver, said at least one cellular transmitter configured to operate with at least one carrier frequency; and
a controller configured to transmit a capability message to a cellular telecommunications network using a radio frequency signal, the capability message comprising at least one information element contained within the capability message that indicates to the cellular telecommunications network whether one of full-duplex mode operation or half-duplex mode operation of the apparatus is available for at least one carrier frequency; the controller also configured to change the mode of operation of the apparatus from operating in the full-duplex mode to operating in the half-duplex mode or from operating in the half-duplex mode to operating in the full-duplex mode in response to at least one trigger condition; wherein the controller is responsive to interference detected by the at least one cellular receiver, and a change in operational mode to half-duplex mode occurs when the detected interference exceeds a threshold.

21. An apparatus, comprising:
a controller configured to use a capability message received as a radio frequency signal from a mobile cellular telecommunications terminal, the capability message comprising at least one information element that indicates whether one of full-duplex mode operation or half-duplex mode operation of the mobile cellular telecommunications terminal is available for at least one carrier frequency that can be transmitted by-the mobile cellular telecommunications terminal; and
allocate resources in the network according to the received capability message;
wherein the controller is configured to change the mode of operation of the apparatus, from operating in the full-duplex mode to operating in the half-duplex mode or from operating in the half-duplex mode to operating in the full-duplex mode in response to at least one trigger condition; wherein the controller is responsive to interference detected by the mobile cellular telecommunications terminal, and a change in operational mode to half-duplex mode occurs when the detected interference exceeds a threshold.

22. A method, comprising:
controlling an apparatus comprising a plurality of cellular transmitters and receivers, where each cellular transmitter is configured to operate with at least one carrier frequency and where said apparatus is configurable to operate in one of at least a single input, single output (SISO) mode or a multiple input, multiple output (MIMO) mode;

transmitting a capability message to a cellular telecommunications network, the capability message comprising at least one information element that indicates whether one of full-duplex mode operation or half-duplex mode operation is available for at least one carrier frequency; and responsive to interference detected by at least one receiver of the plurality of cellular transmitters and receivers, a change in operational mode to half-duplex mode occurs when the detected interference exceeds a threshold.

* * * * *

UNITED STATES PATENT AND TRADEMARK OFFICE
CERTIFICATE OF CORRECTION

PATENT NO. : 8,462,671 B2
APPLICATION NO. : 11/887088
DATED : June 11, 2013
INVENTOR(S) : Mika P. Rinne and Pauli Seppinen Page 1 of 1

It is certified that error appears in the above-identified patent and that said Letters Patent is hereby corrected as shown below:

In the Claims

In Claim 10:
Column 9, line 5, "hot" should be deleted and -- not -- should be inserted.

Signed and Sealed this
Seventeenth Day of September, 2013

Teresa Stanek Rea
*Deputy Director of the United States Patent and TrademarkOffice*